United States Patent [19]

Broecker et al.

[11] Patent Number: 4,623,533

[45] Date of Patent: Nov. 18, 1986

[54] DESULFURIZATION OF H₂S-CONTAINING GASES

[75] Inventors: Franz J. Broecker, Ludwigshafen; Hans Gettert, Gross-Sachsen; Knut Kaempfer, Ludwigshafen, all of Fed. Rep. of Germany

[73] Assignee: BASF Aktiengesellschaft, Ludwigshafen, Fed. Rep. of Germany

[21] Appl. No.: 825,626

[22] Filed: Feb. 3, 1986

Related U.S. Application Data

[63] Continuation of Ser. No. 648,046, Sep. 7, 1984, abandoned.

[30] Foreign Application Priority Data

Sep. 9, 1983 [DE] Fed. Rep. of Germany ....... 3332563

[51] Int. Cl.⁴ ...................... B01D 53/36; C01B 17/04
[52] U.S. Cl. ............................. 423/573 G; 423/564; 423/574 R; 502/335
[58] Field of Search .............. 423/573 G, 564, 419 P, 423/576, 574 R, 574 G; 502/176, 337

[56] References Cited

U.S. PATENT DOCUMENTS

| | | | |
|---|---|---|---|
| 2,787,598 | 4/1957 | Hammar | 423/573 G |
| 3,790,659 | 2/1974 | Storp et al. | 423/573 G |
| 3,912,775 | 10/1975 | Broecker et al. | 423/419 P |
| 4,097,585 | 6/1978 | Fischer | 423/574 R |
| 4,388,288 | 6/1983 | Dupin et al. | 423/564 |
| 4,473,541 | 9/1984 | Palm | 423/574 R |

FOREIGN PATENT DOCUMENTS

| | | | |
|---|---|---|---|
| 622324 | 4/1949 | United Kingdom | 423/573 G |
| 2019827 | 11/1979 | United Kingdom | 423/573 G |
| 2080136 | 2/1982 | United Kingdom | 502/176 |
| 856974 | 8/1981 | U.S.S.R. | |

OTHER PUBLICATIONS

Kirk-Othmer Encyclopedia of Chemical Technology, 3rd ed., vol. 12, pp. 160, 161, 172-175, John Wiley & Sons.

*Primary Examiner*—John Doll
*Assistant Examiner*—Jeffrey Edwin Russel
*Attorney, Agent, or Firm*—Keil & Weinkauf

[57] ABSTRACT

H₂S-containing gases are desulfurized by direct catalytic oxidation of the H₂S to elemental sulfur with an oxygen-containing gas at elevated temperatures by a method in which the catalyst used is a supported titanium dioxide catalyst containing from 0.1 to 25% by weight of nickel oxide and from 0 to 10% by weight of aluminum oxide, the percentages being based on the supported catalyst.

9 Claims, No Drawings

DESULFURIZATION OF H₂S-CONTAINING GASES

This application is a continuation of application Ser. No. 648,046, filed on Sept. 7, 1984, now abandoned.

The present invention relates to a process for the desulfurization of $H_2S$-containing gases by direct catalytic oxidation of the $H_2S$ to elemental sulfur with an oxygen-containing gas.

U.S.S.R. Pat. No. 856,974 discloses a process for the desulfurization of $H_2S$-containing gases by direct catalytic oxidation of $H_2S$ to elemental sulfur with an oxygen-containing gas, in which the catalyst used is titanium dioxide containing iron oxide. However, this process is unsatisfactory, particularly for the desulfurization of gases having a relatively low $H_2S$ content, e.g. not more than 30% of $H_2S$.

There is therefore a need for a process for the desulfurization of $H_2S$-containing gases, in which the disadvantages of the conventional processes can be avoided.

It is an object of the present invention to provide a process for the desulfurization of $H_2S$-containing gases by direct catalytic oxidation of the $H_2S$ to elemental sulfur, in which the desulfurization can be carried out with high yield and selectivity, particularly in the case of gases having a relatively low $H_2S$ content.

We have found that this object and other objects and advantages are achieved, in accordance with the invention, by a process for the desulfurization of $H_2S$-containing gases by direct catalytic oxidation of the $H_2S$ to elemental sulfur with an oxygen-containing gas at elevated temperatures, wherein the catalyst used is a supported titanium dioxide catalyst containing from 0.1 to 25% by weight of nickel oxide and from 0 to 10% by weight of aluminum oxide, the percentages being based on the supported catalyst.

The novel process gives high yields and selectivity, and is particularly useful for the desulfurization of gases having a relatively low $H_2S$ content, e.g. not more than 30, preferably not more than 25, in particular not more than 20, vol. %. It is particularly advantageously used for gases having an $H_2S$ content of from 3 to 30, preferably from 4 to 25, in particular from 5 to 20, vol. %. The novel process thus has substantial advantages over the conventional Claus methods, in which as a rule the $H_2S$-containing gas must contain no less than 50 vol. % of $H_2S$ in order to be able to react the $H_2S$-containing gas with air in a simple manner (cf. Chemie-Ing.-Techn., 39 (1967), 515–520). In contrast, the novel process can be used to convert a gas having a low $H_2S$ content without the latter having to be increased beforehand to 50 vol. % or higher. Another advantage of the novel process is that it is particularly useful for the direct catalytic oxidation of the hydrogen sulfide in a simple tube reactor. It is surprising that the novel process can be employed in a simple tube reactor to give sulfur yields of more than 90%, since U.S. Pat. No. 3,393,050 (cf. also U.S.S.R. Pat. No. 856,974) states that in order to achieve a high sulfur yield, a catalyst-free space must be maintained between the catalyst basket and the tube wall, and the heat of reaction and the resulting elemental sulfur in liquid form must be removed simultaneously from the tube reactor.

In the novel process, the catalyst used is a supported titanium dioxide catalyst containing from 0.1 to 25, preferably from 0.5 to 20, in particular from 1 to 12, % by weight of nickel oxide and from 0 to 10, preferably from 0.1 to 10, in particular from 0.3 to 5, % by weight of aluminum oxide, the remainder, i.e. from 65 to 99.9, preferably from 70 to 99.4, in particular from 83 to 98.7, % by weight, being titanium dioxide and the percentages being based on the supported catalyst. Advantageously, the titanium dioxide carrier material is anatase having a BET specific surface area of not less than 50, preferably from 100 to 300, in particular from 120 to 300, m²/g.

A catalyst which is particularly advantageously used is one which contains calcined $Ni_6Al_2(OH)_{16}CO_3 4H_2O$. The calcination of this compound is carried out in general at from 150° to 600° C., preferably from 250° to 500° C., in particular from 300° to 400° C.

In an advantageous embodiment of the novel process, the direct catalytic oxidation of the $H_2S$ to elemental sulfur with an oxygen-containing gas is carried out in a tube reactor with indirect removal of the heat of reaction by means of a coolant, the catalyst being present in the tubes of the tube reactor and completely filling these tubes over their entire cross-section. Advantageously, the direct catalytic oxidation is carried out by an isothermal procedure. In general, the catalytic oxidation is carried out so that the gas from the reaction emerges from the tube reactor at from 180° to 400° C., preferably from 200° to 350° C., in particular from 220° to 320° C.

In general, the catalytic oxidation is carried out under atmospheric or slightly superatmospheric pressure, but it is also possible to employ reduced pressure. The pressure used is in general from 0.5 to 10, preferably from 0.6 to 5, in particular from 0.8 to 2, bar.

Examples of suitable coolants for the catalytic oxidation in the tube reactor are water and organic heat-transfer oils, such as diphenyl or diphenyl oxide. The preferred organic heat-transfer oil is a mixture of diphenyl and diphenyl oxide, advantageously in a weight ratio of from 1:20 to 10:1, preferably from 1:10 to 5:1. The azeotropic mixture consisting of 27% of diphenyl and 73% of diphenyl oxide is particularly advantageously used. Where an organic heat-transfer oil is used as the coolant, the heat of reaction is advantageously removed by evaporative cooling.

The tube reactor can consist of one tube surrounded by a jacketed space. In general, however, the tube reactor contains a plurality or a large number of tubes which are surrounded by a jacketed space.

The $H_2S$-containing gases to be desulfurized according to the invention are obtained in the form of, for example, acid gases from partial oxidation plants, coal gasification plants or natural gas washers or in refineries. The process is also suitable for the direct desulfurization of $H_2S$-containing natural gases.

Examples of oxygen-containing gases which are suitable for the catalytic oxidation are oxygen itself and air which may or may not have been enriched in oxygen by adding the latter.

Separation of the sulfur formed in the tube reactor from the reaction mixture obtained from this reactor is advantageously carried out in a condensation stage downstream from the tube reactor. This is advantageously carried out by condensing the sulfur, for example in a heat exchanger, and separating off the condensed sulfur in a separator, e.g. a cyclone separator.

In the direct catalytic oxidation, the sulfur yields obtained are higher than 90%, e.g. 93%, based on the hydrogen sulfide present in the $H_2S$-containing gas used.

The reaction mixture obtained after the catalytic oxidation and after the sulfur formed has been separated off is then advantageously converted over a catalyst containing titanium dioxide, in an adiabatically operated reactor, in order to remove the sulfur compounds still present in the reaction gas, the exit temperature of the gaseous reaction mixture leaving the said reactor being maintained at in general from 150° to 350° C., preferably from 150° to 300° C., in particular from 160° to 250° C. Preferably, titanium dioxide as such is used, for example a conventional technical-grade titanium dioxide. The particularly advantageously used titanium dioxide is anatase having a BET specific surface area of not less than 50, preferably from 100 to 300, in particular from 120 to 300, m²/g.

Separation of the sulfur formed in the adiabatic reactor from the reaction mixture obtained from this reactor is advantageously carried out in a condensation stage downstream from the adiabatic reactor. This is advantageously carried out by condensing the sulfur, for example in a heat exchanger, and separating off the condensed sulfur in a separator, e.g. a cyclone separator.

While in the first stage of the catalytic oxidation in the tube reactor, H₂S conversions to elemental sulfur of, for example, from 92 to 95% are generally obtained, the total conversion to elemental sulfur can be increased to about 98% by combination with the second stage in the adiabatic reactor.

In order to remove H₂S still present in the reaction gas, and other sulfur compounds and elemental sulfur present, the reaction gas obtained after the catalytic oxidation and after the sulfur formed has been separated off is generally subjected to further purification operations.

In a preferred process for the removal of the sulfur compounds still present in the reaction gas and of the elemental sulfur, the gas obtained from the condensation stage downstream from the adiabatic reactor is mixed with hydrogen and, in order to convert sulfur compounds still present in the gas, and elemental sulfur present, to hydrogen sulfide, is then catalytically hydrogenated at elevated temperatures over a catalyst containing nickel and molybdenum; cobalt and molybdenum or nickel, cobalt and molybdenum, and the resulting hydrogen sulfide is washed out of the gas stream obtained from the hydrogenation, by treatment with a solvent, and is separated off by regenerating the laden solvent and advantageously recycled to the catalytic oxidation in the tube reactor. Catalysts preferably used for the catalytic hydrogenation are those which contain nickel and molybdenum or cobalt, nickel and molybdenum or, preferably, cobalt and molybdenum, the metals being employed in general in the form of their compounds, preferably as oxides and/or sulfides. In general, the weight ratio of nickel to molybdenum or cobalt to molybdenum or nickel and cobalt to molybdenum (calculated as their oxides, i.e. nickel as NiO, cobalt as CoO and molybdenum as MoO₃) is from 1:50 to 50:1, preferably from 1:30 to 10:1, in particular from 1:10 to 3:1. Preferably, these catalysts containing nickel and/or cobalt and molybdenum or their compounds are used in the form of supported catalysts, aluminum oxide being the preferred carrier. The hydrogenation is generally carried out at from 200° to 450° C., preferably from 250° to 400° C., in particular from 280° to 370° C. The H₂S is washed out of the H₂S-containing gas obtained from the hydrogenation, this advantageously being done by means of a gas wash, using a selective solvent. The resulting acid gas containing the H₂S gas washed out is advantageously recycled to the catalytic oxidation. Examples of suitable selective solvents for the gas wash are ®ALKAZID DIK an approximately 3.4 molar aqueous solution of the potassium salt of N,N-dimethylaminoacetic acid, dialkyl ethers of polyethylene glycol, e.g. ®SEPASOLV MPE which is a mixture of ethylene glycol methyl isopropyl ethers having a mean molecular weight of about 320, triethanolamine and methyldiethanolamine.

In another preferred process for the removal of the sulfur compounds still present in the reaction gas, and of the elemental sulfur present, the gas obtained from the condensation stage downstream from the adiabatic reactor is first catalytically hydrogenated as described in the paragraph above, in order to convert sulfur compounds still present in the gas, and elemental sulfur present, to hydrogen sulfide. To separate off the hydrogen sulfide present in the gas obtained from the hydrogenation, this gas is mixed with an oxygen-containing gas and ammonia, and is then passed over active carbon, the hydrogen sulfide being oxidized to elemental sulfur, which is absorbed by the active carbon. Examples of suitable oxygen-containing gases are oxygen itself and air enriched in oxygen by adding the latter, but preferably air itself. In addition to the oxygen-containing gas, the gas obtained from the hydrogenation is mixed with ammonia, advantageously in gaseous form, the ammonia being added in general in amounts of from 1 to 20,000, preferably from 5 to 2,000, in particular from 10 to 1,000, mg per m³ (S.T.P) of gas. The gas mixture obtained after the addition of the oxygen-containing gas and of ammonia is passed over active carbon, in general at from 5° to 150° C., preferably from 20° to 120° C., in particular from 30° to 80° C., the space velocities employed advantageously being from 10 to 10,000, preferably from 100 to 2,000, in particular from 200 to 1,000, m³ (S.T.P.) of gas mixture per m³ of the active carbon bed per hour. During this procedure, the hydrogen sulfide is selectively oxidized to elemental sulfur, which is adsorbed onto the active carbon.

Using this procedure, it is possible to reduce the H₂S content in the gas obtained from the active carbon bed to less than 1 mg/m³ (S.T.P.).

The sulfur-laden active carbon bed is advantageously regenerated, sulfur being recovered. This is done, for example, by removing the sulfur by passing a hot gas, e.g. carbon dioxide or nitrogen, over the sulfur-laden active carbon bed, and then separating off the sulfur from the hot gas, for example by condensation. In general, the temperature of the gas passed over the active carbon bed is from 100° to 700° C., preferably from 150° to 600° C., in particular from 200° to 550° C. The active carbon bed can also be regenerated by washing out the sulfur load by extraction with ammonium polysulfide solution.

The Examples which follow illustrate the invention.

EXAMPLE 1

Preparation of the supported titanium dioxide catalyst containing NiO and Al₂O₃

(a) The titanium dioxide was obtained by a procedure in which the titanium oxide hydroxide obtained when ilmenite (FeTiO₃) was digested with sulfuric acid was dried at from 100° to 150° C. The titanium dioxide obtained in the drying procedure exhibited a loss on ignition (2 h at 900° C.) of 20.6% by weight and a BET specific surface area of 210 m²/g and was used as a starting material for the catalyst.

(b) Calcined nickel aluminum hydroxide carbonate of the formula $Ni_6Al_2(OH)_{16}CO_3.4H_2O$ was prepared as follows:

640 l of an aqueous solution of 279.4 kg of $Ni(NO_3)_2.6H_2O$ and 120.04 kg of $Al(NO_3)_3.9H_2O$ (solution 1), 750 l of an aqueous solution of 159 kg of technical-grade sodium carbonate (solution 2) and a quantity of water contained in a stirred kettle were heated separately to 80° C. Precipitation was carried out at 80° C. by simultaneously feeding solutions 1 and 2 into the water contained the stirred kettle. When the precipitation was complete, stirring was continued at 80° C. for a further 15 minutes, after which the precipitate was filtered off, washed, dried at 110° C. and then calcined at 350° C. to give 100 kg of an oxide material consisting of NiO and $Al_2O_3$ and having a loss on ignition of 10.1% by weight.

(c) The products obtained as described in (a) and (b) were converted to the catalyst by the following procedure:

51 kg of titanium dioxide and 4 kg of the calcined oxide material were dry blended in a kneader for 5 minutes, after which a mixture of 2 l of concentrated $HNO_3$ and 20.08 l of water was added and kneading was carried out for 2 hours. The resulting paste was converted to 4 mm extrudates, which were dried at 110° C. and then calcined for 6 hours at 350° C. 46.5 kg of 4 mm extrudates having a loss on ignition (2 h at 900° C.) of 7.75% by weight were obtained, the extrudates being composed of:

84.75% by weight of $TiO_2$
6.00% by weight of NiO
1.50% by weight of $Al_2O_3$.

The physical properties were as follows:

| Compressive strength | 1.44 kp/mm |
| Bulk density | 0.975 kg/l |
| BET specific surface area | 157.0 m²/g. |

EXAMPLE 2

Preparation of the $TiO_2$ catalyst for the downstream adiabatic reactor 45.9 kg of the titanium dioxide obtained as described in Example 1 (a) were kneaded with 18 l of water for 2 hours in a kneader. The resulting paste was converted to 4 mm extrudates, which were dried at 110° C. and then calcined for 6 hours at 350° C. to give 39.3 kg of a $TiO_2$ catalyst having the following properties:

| Bulk density | 1.097 kg/l |
| Compressive strength | 1.40 kp/mm |
| BET specific surface area | 168.3 m²/g |
| Loss on ignition (2 h at 900° C.) | 7.18% by weight |

EXAMPLE 3

30 m³ (S.T.P.)/hour of an acid gas consisting of 89 vol. % of $CO_2$, 11 vol. % of $H_2S$ and traces of $NH_3$ and HCN, as obtained in the gasification of residues having a high sulfur content, were mixed with 1.65 m³ (S.T.P.)/hour of oxygen and then heated to 180° C. The gas mixture was passed from below into a tube reactor consisting of two tubes having an internal diameter of 76 mm and a length of 2500 mm. The tubes each contained 9 l of the catalyst obtained as described in Example 1. The jacketed space surrounding the tubes contained a mixture of 27% of diphenyl and 73% of diphenyl oxide (ᴿDiphyl from Bayer AG) as a coolant. The exothermic reaction which took place vaporized the Diphyl, which was then condensed in a condenser and recycled to the tube reactor. The reaction mixture which left the tube reactor at 265° C. was cooled to 130° C. and passed into a condenser, in which 4.40 kg/hour of sulfur were separated off. This corresponds to a conversion of 93.4%. The gas leaving the sulfur condenser had the following composition:

| $CO_2$ | 89 vol. %, |
| $H_2S$ | 0.22 vol. %, |
| $SO_2$ | 0.11 vol. %, and |
| $H_2O$ | 10.67 vol. %. |

In addition, the gas contained 1 g of sulfur vapor per m³ (S.T.P.) of gas.

This gas mixture was then heated to 200° C. and fed to an adiabatically operated reactor containing 30 l of the $TiO_2$ catalyst described in Example 2. Reaction of hydrogen sulfide with sulfur dioxide (2 $H_2S + SO_2 \rightarrow 3/2\ S_2 + 2\ H_2O$) once again resulted in the formation of sulfur, and the total conversion was thus further increased. The gas leaving the adiabatic reactor at 205° C. was cooled to 130° C. and fed to another condenser, in which 0.186 kg/hour of sulfur was separated off. The gas leaving the second sulfur condenser had the following composition:

| $CO_2$ | 89.0 vol. %, |
| $SO_2$ | 0.073 vol. %, |
| $H_2S$ | 0.146 vol. %, |
| COS | <10 vol. ppm and |
| $H_2O$ | 10.781 vol. %. |

In addition, the gas contained about 1 g of sulfur vapor per m³ (S.T.P.) of gas.

The total conversion in the formation of sulfur in the tube reactor and the adiabatic reactor was 97.37%.

The gas obtained from the second condenser for separating off the sulfur was then heated to 330° C., 0.35 m³ (S.T P.)/hour of $H_2$ was added and the mixture was then passed into a hydrogenation reactor containing 30 l of $Co/Mo/Al_2O_3$ hydrogenation catalyst. In this hydrogenation stage, all sulfur compounds and the sulfur present in the gas as a result of the vapor pressure were converted to $H_2S$, so that the gas emerging from the hydrogenation reactor contained, in addition to $CO_2$, $H_2$ and $H_2O$, only hydrogen sulfide.

The gas obtained from the hydrogenation reactor was cooled to 35° C., the major part of the water present in the gas being separated off by condensation. 0.1 m³ (S.T.P)/hour of oxygen and 0.06 m³ (S.T.P.)/hour of ammonia were then added to the gas, and this mixture was heated to 40° C. and passed into an active carbon bed. The active carbon reactor contained 75 l of active carbon having a specific surface area greater than 1000 m²/g.

In the active carbon bed, the hydrogen sulfide was selectively oxidized to sulfur, which was deposited on the active carbon. At the reactor exit, the hydrogen sulfide content was less than 0.1 mg/m³ (S.T.P.) and the COS concentration less than 10 mg/m³ (S.T.P.). This corresponded to a sulfur conversion higher than 99.99%.

When the active carbon had taken up roughly its own weight of sulfur, it was regenerated by treating it with ammonium sulfide solution, the sulfur being extracted in this procedure.

We claim:

1. A process for the desulfurization of an $H_2S$-containing gas by direct catalytic oxidation of the $H_2S$ to elemental sulfur with an oxygen-containing gas at temperatures from 180° to 400° C., wherein the catalyst used contains from 0.1 to 25% be weight of nickel oxide, from 0 to 10% by weight of aluminum oxide and 65 to 99.9% by weight of titanium dioxide, wherein said titanium dioxide functions both catalytically and as a carrier material.

2. A process as claimed in claim 1, wherein the titanium dioxide carrier material is anatase having a BET specific surface area of not less than 50 $m^2/g$.

3. A process as claimed in claim 1, wherein a catalyst containing the calcined compound $Ni_6Al_2(OH)_{16}CO_3.4H_2O$ is used.

4. A process as claimed in claim 1, wherein the desulfurization is carried out in a tube reactor with indirect removal of the heat of reaction by means of a coolant, and the catalyst is present in the tubes of the tube reactor and completely fills these tubes over their entire cross-section, the temperature of the gaseous reaction mixture leaving the tube reactor is maintained at from 180° to 400° C., and the sulfur formed in the tube reactor is separated off from the reaction mixture obtained from this reactor, this step being carried out in a condensation stage downstream from the tube reactor.

5. A process as claimed in claim 4, wherein the heat of reaction is removed by evaporative cooling, using an organic heat-transfer oil as the coolant.

6. A process as claimed in claim 4, wherein the reaction mixture obtained from the tube reactor is freed from the sulfur formed, this step being carried out in the condensation stage downstream from the tube reactor, and is then converted in an adiabatically operated reactor over a catalyst containing titanium dioxide in order to effect further desulfurization, the temperature of the gaseous reaction mixture leaving the adiabatic reactor being maintained at from 150° to 350° C.

7. A process as claimed in claim 6, wherein the titanium dioxide used is anatase having a BET specific surface area of not less than 50 $m^2/g$.

8. A process as claimed in claim 6, wherein the gas obtained from a condensation stage for separating off the sulfur formed and located downstream from the adiabatic reactor is mixed with hydrogen and, in order to convert sulfur compounds still present in the gas, and elemental sulfur present, to hydrogen sulfide, is then catalytically hydrogenated at from 200° to 450° C. over a catalyst containing nickel and molybdenum, cobalt and molybdenum or nickel, cobalt and molybdenum, and the resulting hydrogen sulfide is washed out of the gas stream obtained from the hydrogenation, by treatment with a solvent, and is separated off by regenerating the laden solvent and recycled to the catalytic oxidation.

9. A process as claimed in claim 6, wherein the gas obtained from a condensation stage for separating off the sulfur formed and located downstream from the adiabatic reactor is mixed with hydrogen and, in order to convert sulfur compounds still present in the gas, and elemental sulfur present, to hydrogen sulfide, is then catalytically hydrogenated at from 200° to 450° C. over a catalyst containing nickel and molybdenum, cobalt and molybdenum or nickel, cobalt and molybdenum, and, in order to separate off the hydrogen sulfide, an oxygen-containing gas and ammonia are added to the gas obtained from the hydrogenation, and the resulting mixture is then passed over active carbon, the hydrogen sulfide being oxidized to elemental sulfur, which is absorbed onto the active carbon.

* * * * *